Feb. 1, 1966  R. J. FERRAN  3,232,114
PRESSURE TRANSDUCER
Filed June 15, 1962
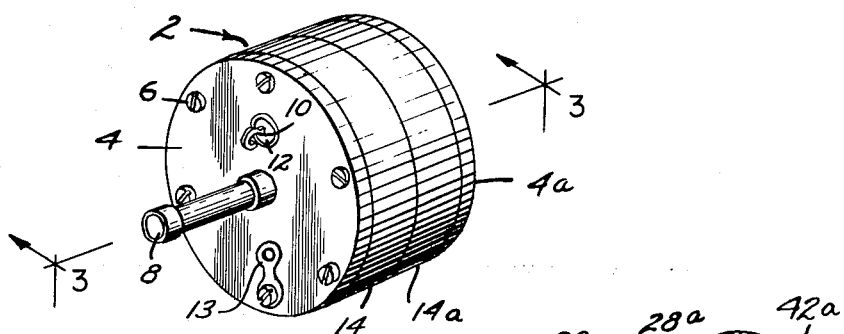
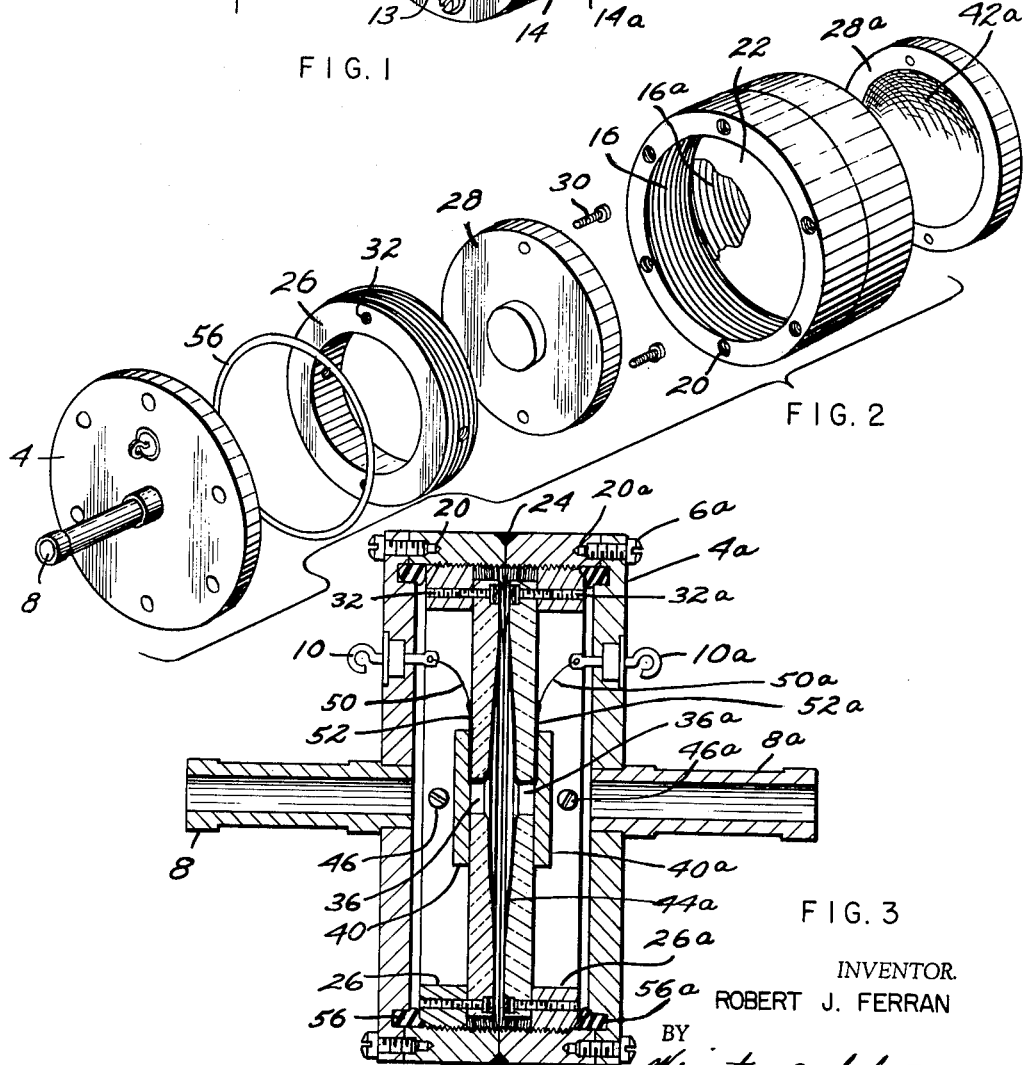
INVENTOR.
ROBERT J. FERRAN
BY
ATTORNEYS 3,232,114
PRESSURE TRANSDUCER
Robert J. Ferran, Framingham, Mass., assignor to Acton Laboratories, Inc., Acton, Mass., a corporation of Massachusetts
Filed June 15, 1962, Ser. No. 202,752
4 Claims. (Cl. 73—398)

This invention relates to pressure-sensing devices and more particularly to capacitive pressure transducers.

Transducers of the kind to which the present invention relates are characterized by a diaphragm which is supported between two stationary members made of insulating material. The stationary members and the diaphragm form two separate fluid pressure chambers. The diaphragm is designed to be deflected into one chamber or the other according to the magnitude and direction of the difference in fluid pressures applied to the two chambers. Each stationary member has a concave depression facing the diaphragm, and the surface defining each depression is coated with a conductive coating. The two conductive coatings function as electrodes and cooperate with the diaphragm to form a differential capacitor. The variation in capacity due to movement of the diaphragm in response to a change in differential pressure is sensed by placing the capacitor in a suitable circuit, e.g., a bridge circuit, adapted to provide an output signal which varies as a function of the change in capacity. Although these capacitive transducers are well known and have gained considerable acceptance in fields requiring the ability to measure accurately small differentials in fluid pressure, their manufacture and reliability have been handicapped by certain design considerations intended to assure minimum zero shift and nearly zero hysteresis. In this connection, considerable effort has been expended in clamping or bonding the diaphragm between the two supporting members so that they will form a so-called "unitary elastic structure" wherein there will be no frictional or sliding deformation or movement of the two conductive coatings relative to the diaphragm. Although this kind of structure helps reduce certain errors, the fact remains that at best it is a unitary elastic structure in behavior only. Structurally, it still consists of at least three separate elements which must be made and mounted in a very precise manner in order to have behavior akin to a unitary or integrated structure. Heretofore, one requirement has been to squeeze the stationary members and the diaphragm together under a force of about 1 ton in order to reduce zero shift and hysteresis. Moreover, the force must be applied substantially normal to the surfaces of the two stationary members which are in direct engagement with the diaphragm. This prevents warping of the stationary members and their electrodes, with resulting elimination of inaccuracies in measurement. Necessarily, this type of arrangement involves precise finishing of the surfaces of the stationary members which engage the diaphragm, precise application of pressure to the stationary members, precise dimensioning of other parts, and extensive care and time in the assembly and adjustment of the finished device. Moreover, the resulting structure has been difficult to maintain and repair. Other important limitations have been lack of control over sensitivity and inability to provide measurement in terms of absolute pressure.

Accordingly, the primary object of the present invention is to provide a new and improved capacitive transducer which is relatively simple and economical in construction, rugged in operation, capable of being manufactured in quantity with consistent performance characteristics, adjustable for sensitivity, and capable of providing an output based on gage or absolute pressure.

Another specific object of the present invention is to provide a transducer having a pressure responsive variable capacitor comprising a diaphragm and a metallic electrode wherein the normal or at-rest spacing between the diaphragm and the electrode is adjustable, and further including means for locking the electrode against movement relative to the diaphragm. In the attainment of these and other objects, it is contemplated that the diaphragm be mounted between two casing members, the diaphragm and casing members being welded together with the diaphragm under tension. Mounted within the casing members are one or two plates of insulating material having a conductive surface in confronting relation with the diaphragm. Each plate is adjustable longitudinally within the housing, thereby making it possible to vary the spacing between its conductive surface and the diaphragm.

Other objects and many of the attendant advantages of the present invention will become more readily apparent as reference is had to the following detailed specification which is to be considered together with the accompanying drawings wherein:

FIG. 1 is a perspective view of a preferred form of transducer embodying the present invention;

FIG. 2 is an exploded view illustrating some of the component parts of the transducer; and FIG. 3 is a longitudinal section taken along line 3—3 of FIG. 1.

Turning now to the drawings, the particular construction selected for illustration is a differential pressure sensing instrument designed for use in equipment where extreme sensitivity, wide dynamic range, high speed of response, and accuracy are required. The illustrated embodiment comprises a housing or casing identified generally at 2 which has a header 4 at one end and an identical header 4a at the other end. The headers are secured to the housing by means of screws 6 and 6a. These headers have central openings in which are mounted short pressure tubes 8 and 8a adapted to be connected into a system providing differential pressures. The headers 4 also are provided with electrical terminals 10 and 10a secured in place by glass seals 12. A terminal lug 13 also is secured to the casing by one of the screws 6.

The housing 2 is fabricated from two identical parts 14 and 14a which are cylindrical sections. These sections are provided with like internal threads 16 and 16a and also like pluralities of tapped holes 20 and 20a to receive screws 6 and 6a respectively for attaching the headers in place. The two sections 14 and 14a serve to support a resilient diaphragm 22. The diaphragm 22 is formed of metal and is under uniform tension. In practice, the diaphragm is maintained under a stress of approximately 60,000 pounds. The significant thing about the diaphragm is that its marginal portion is disposed between and is welded to the two housing sections 14 and 14a as shown at 24 (FIG. 3). The welding process not only secures the two casing sections to the diaphragm but also secures them to each other. The diaphragm is carefully welded to the two housing sections while in stressed condition. The prestressing of the diaphragm provides restoring forces which causes the diaphragm to return to a precise and identical position when the pressures applied to the opposite sides of the diaphragm are perfectly balanced or entirely removed. Tensioning of the diaphragm also places its resonant frequency at over approximately 2,000 cycles per second, thereby yielding a response time of better than 1 millisecond. What is even more important is that this manner of attaching the diaphragm to the housing precludes slippage under any condition of temperature range, shock, or vibration, thereby reducing zero and sensitivity shift.

Moreover, since the diaphragm is secured between the two sections 14 and 14a, it can be mounted exactly at right angles to the axis of the casing because the ends of the casing sections which engage the diaphragm can be machined very flat and at exactly right angles to the axis.

The screw threads 16 and 16a are adapted to accommodate metal rings 26 and 26a which are identical in size and configuration. These two rings act as supports for identical ceramic discs 28 and 28a. These ceramic discs have an outside diameter slightly smaller than the inside diameter of the casing, whereby they may be moved longitudinally within the housing. They are secured to the rings by means of screws 30 and 30a which screw into appropriate tapped holes 32 and 32a formed in rings 26 and 26a respectively. These ceramic discs have center openings 36 and 36a which are covered by filter elements 40 and 40a respectively. Preferably, the filter elements are made of sintered metal which is porous to fluids and yet acts as a barrier to solid impurities which might be entrained in the fluids. A further advantage of sintered metal filters is that they are able to withstand relatively high temperatures and will not deteriorate rapidly due to contaminants in the fluids.

The inner surfaces of the ceramic discs 28 and 28a are provided with concave depressions 42 and 42a respectively. The surfaces of these depressions are covered with thin conductive coatings 44 and 44a which may be conveniently applied by vacuum evaporation or a similar process. These coatings serve as the fixed electrodes of a differential capacitor, the movable member of the capacitor being the metal diaphragm 22. Preferably, the coatings are formed of gold; however, other metals also may be used. The coatings do not touch the diaphragm unless an over-pressure causes the diaphragm to bottom against them since the coatings are confined to the depressions and terminate short of the marginal portions of the discs. In this connection, it is to be appreciated that the ceramic discs do not serve to hold the diaphragm in tension, and in fact, they are set so that their marginal portions are out of contact with the diaphragm when the pressures applied to the opposite sides thereof are equal.

The concave contour of the depressions 42 is not novel with applicant but has been resorted to previously. The advantages of the concave contour is that it gives greater sensitivity as compared with a flat-bottom depression of comparable depth. In this connection, it is to be observed that turning the rings 26 and 26a in or out changes the spacing between the electrodes and the diaphragm. This is advantageous since changing the electrode spacing affects the sensitivity of the device. The rings 26 and 26a are provided with radial set screws 46 and 46a for locking the electrodes at a selected position.

As seen in FIG. 3, the terminals 10 and 10a are connected to leads 50 and 50a respectively. The latter in turn are connected to the conductive coatings 44 and 44a. They may be attached in one of several ways. In the illustrated embodiment, the conductive coatings are provided with tab portions 52 and 52a which extend through the openings 36 and 36a and over onto the outer sides of discs 28 and 28a respectively where the leads can be connected thereto as shown. Although not shown as such, it is to be understood that the leads are sufficiently long to permit the headers 4 and 4a to be pulled away enough to gain access to rings 26 and 26a and their set screws 46 and 46a. It is to be observed also that while the headers make solid metal-to-metal engagement with the ends of the housing, it is preferred to improve the sealing still further by employing O-rings 56 and 56a.

It is to be understood that the diaphragm should be made of the same material as the casing 2. Preferably, the diaphragm and the casing 2 should be made of an alloy having a near constant modulus of elasticity. A near constant modulus of elasticity facilitates attainment of substantially zero creep and zero hysteresis. Such alloys are well known to persons skilled in the art and have the advantage of being easily welded. Alternatively, the housing and diaphragm could be made of stainless steel. In a typical case, the diaphragm will have a thickness of .001 inch.

Transducers incorporating the construction shown in FIGS. 1–3 have proven to be as accurate and reliable as transducers heretofore available. Additionally, they provide variable control over sensitivity by virtue of the fact that the position of the capacitor plates relative to the diaphragm is adjustable through rotation of rings 26 and 26a. Typically, these are adjusted so that for full-scale output from the transducer, approximately 60 percent of the applied voltage will correspond to full-scale pressure. Actual measurements on transducers embodying the illustrated construction have shown near perfect zero stability coupled with relatively wide dynamic range, permitting the sensing of pressure differentials from below 1 micron of mercury to as high as 25 pounds per square inch.

A further advantage of the invention is that it lends itself well to measurements based on absolute pressures. Due to the fact that the diaphragm is secured directly to the casing and not to the two electrodes, it is possible to convert the illustrated device so that a vacuum may be maintained on one side of the diaphragm. Thus, the header 4a and the gasket 56a may be eliminated and replaced by a solid imperforate header which is welded directly to the end of the housing. By conventional evacuating techniques, the housing section 20a may be fully evacuated and maintained so while the imperforate header is welded in place. The welded connection assures that the vacuum will be preserved so that the diaphragm will respond to changes in absolute pressure applied via inlet tube 8. Depending upon full-scale range, the thickness of the diaphragm is adjusted to assure proper diaphragm action.

Although not shown, it is to be understood that the transducer may be used in various systems. In the usual case, the diaphragm is grounded by terminal lug 13, the electrodes are excited with an A.C. voltage via terminals 10, and changes in pressure are sensed as a change in voltage ratio. Hence, variation in the absolute magnitude of capacitance from such factors as changes in dielectric constants of the gas or fluid do not affect accuracy since it is voltage ratio that contains the desired pressure information. The manner of connecting the electrodes and diaphragm and typical uses of capacitive transducers are illustrated or suggested in U.S. Patents 2,753,515 and 2,907,320. The circuit shown in FIG. 4 of the latter patent is incorporated herein by reference.

It is to be understood also that although two electrodes are embodied in the illustrated device, it is possible to make an operative and useful device using only one electrode, as shown in the U.S. Patent 2,667,786.

Obviously, many other modifications and variations of the present invention are possible in the light of the foregoing teachings. It is to be understood, therefore, that the invention is not limited in its application to the deails of construction and arrangement of parts specifically described or illustrated, and that within the scope of the appended claims, it may be practiced otherwise than as specifically described or illustrated.

I claim:

1. A pressure transducer comprising a cylindrical casing formed of two hollow cylindrical metal sections disposed in end-to-end relationship with an electrically conducting diaphragm disposed therebetween, said metal sections welded to each other and also to the edge of said diaphragm to form a permanent integrated structure, said diaphragm held under tension by said metal sections, end members attached to the opposite ends of said metal sections, said end members and said diaphragm cooperating to define two separate pressure chambers in said casing located on opposite sides of said diaphragm, means for admitting fluid pressure to each chamber, a pair of rings each screwed into a different one of said metal sections, two plates each secured to a separate ring, each plate having a depression therein facing said diaphragm, two electrodes each attached to a separate one of said plates in the depression thereof, said electrodes insulated from said casing and spaced from said diaphragm so as to form a differential capacitor with said diaphragm, the spacing between said electrodes and said diaphragm adjustable by rotation of said rings, and means for connecting said electrodes to means for sensing changes in capacitance of said capacitor resulting from deflection of said diaphragm in response to a difference in the pressures in said two pressure chambers.

2. A pressure transducer as defined by claim 1 wherein said casing and diaphragm are constructed of an alloy having a near constant modulus of elasticity.

3. A pressure transducer comprising a cylindrical casing formed of two hollow cylindrical metal sections disposed in end-to-end relationship with an electrically conducting diaphragm disposed therebetween, said metal sections welded to each other and also to the edge of said diaphragm to form a permanent integrated structure, said diaphragm held under tension by said metal sections, end members attached to the opposite ends of said metal sections, said end members and said diaphragm cooperating to define two separate pressure chambers in said casing located on opposite sides of said diaphragm, means for admitting fluid pressure to at least one of said chambers, a pair of rings each screwed into a different one of said metal sections, two plates each secured to a separate ring, each plate having a depression therein facing said diaphragm, two electrodes each attached to a separate one of said plates in the depression thereof, said electrodes insulated from said casing and spaced from said diaphragm so as to form a differential capacitor with said diaphragm, the spacing between said electrodes and said diaphragm determined by rotation of said rings relative to said metal sections, means for locking said rings against movement relative to said metal sections, and means for connecting said electrodes to means for sensing changes in capacitance of said capacitor resulting from deflection of said diaphragm in response to a difference in the pressures in said two pressure chambers.

4. A pressure transducer comprising a cylindrical casing formed of two hollow cylindrical metal sections disposed in end-to-end relationship with an electrically conducting diaphragm disposed therebetween, said metal sections welded to each other and also to the edge of said diaphragm to form a permanent integrated structure, said diaphragm held under tension by said metal sections, end members attached to the opposite ends of said metal sections, said end members and said diaphragm cooperating to define two separate pressure chambers in said casing located on opposite sides of said diaphragm, means for admitting fluid pressure to at least one of said chambers, each metal section having a threaded inner cylindrical surface, a pair of rings each having a threaded peripheral surface, each ring screwed into a different one of said sections with its threaded peripheral surface mating with the threaded inner cylindrical surface of said one section, two plates each secured to a separate ring, each plate having a depression therein facing said diaphragm, two electrodes each attached to a separate one of said plates in the depression thereof, said electrodes insulated from said casing and spaced from said diaphragm so as to form a differential capacitor with said diaphragm, the spacing between said electrodes and said diaphragm determined by rotation of said rings relative to said metal sections, and means for connecting said electrodes to means for sensing changes in capacitance of said capacitor resulting from deflection of said diaphragm in response to a difference in the pressures in said two pressure chambers.

References Cited by the Examiner
UNITED STATES PATENTS

| | | | |
|---|---|---|---|
| 1,346,941 | 7/1920 | Crocker | 73—408 |
| 2,463,414 | 4/1949 | Nelson | 73—408 X |
| 2,751,530 | 6/1956 | Armstrong. | |
| 2,907,320 | 10/1959 | Weese et al. | 73—398 X |
| 2,986,715 | 5/1961 | Church et al. | |
| 2,999,385 | 9/1961 | Wolfe | 73—398 |
| 2,999,386 | 9/1961 | Wolfe | 73—398 |
| 3,027,769 | 4/1962 | Coon | 73—398 |

RICHARD C. QUEISSER, *Primary Examiner.*

JOSEPH P. STRIZAK, *Examiner.*